United States Patent Office 3,395,021
Patented July 30, 1968

3,395,021
BEVERAGE POWDER PRODUCING PULPY
MOUTH FEEL WHEN DISSOLVED
Martin Glicksman, Valley Cottage, and Elizabeth H.
Farkas, Yonkers, N.Y., assignors to General Foods Corporation, White Plains, N.Y., a corporation of Delaware
No Drawing. Filed Oct. 14, 1964, Ser. No. 403,919
14 Claims. (Cl. 99—78)

ABSTRACT OF THE DISCLOSURE

A new fruit beverage powder has been prepared which on dissolution in water yields a drink with a pulpy mouth feel similar to natural fresh fruit beverages. The pulpy effect is achieved by incorporation of a water-soluble and a water-swellable gum such that the degree of swelling of the water-swellable gum is controlled by the water-soluble gum.

---

This invention relates to a beverage powder of the fruit-flavored type. More particularly, the invention relates to a beverage powder that is marketed in a substantially dry, relatively finely divided form and is capable of being mixed with water at room temperature or below shortly before consumption to provide a quickly prepared, fruit-flavored beverage.

In the early 1960's the price of citrus fruit generally increased because of frost damage to trees and crops. There has been given, therefore, increased attention to the provision of suitable substitutes for citrus fruit juices, such substitutes being those which would have the nutritional value, appearance and palatability of juices from freshly squeezed fruit, but would be marketable at lower prices. While many attempts have been made, powdered beverage compositions have not been available which, when added to cold water, possess such features.

Of course, frozen fruit juice concentrates have long been available, and such concentrates are adapted to be reconstituted with water to produce a beverage preparation resembling freshly squeezed fruit juices. However, the damage to fruit crops and trees by weather is also reflected in the price of frozen concentrates, just as it is evident in the cost of fresh fruit or in the freshly squeezed juices obtained therefrom, since frozen concentrates are usually prepared from fresh fruit and fruit juice. It is also well known to prepare dry beverage mixtures by mixing a fruit acid with sugar and suitable color and fruit flavor. In general, such preparations have not attained complete acceptance because they are considered to lack the texture and fullness of freshly squeezed fruit juice. Moreover, the lack of pulpiness associated with fruit juices, particularly citrus fruit juices, has been found to be lacking.

It is, therefore, a primary object of the present invention to provide a fruit-flavored beverage powder, which can readily be mixed with cold water to produce a fruit-flavored beverage closely resembling freshly squeezed fruit juice in opacity, appearance, pulpiness, viscosity and palatability.

The object of the present invention is achieved through the use of a gum soluble in water at temperatures varying between about 32° to 70° F. and a gum that is only swellable in such water. Of course, the water will not be in a pure form, particularly since it is common to add sweetening agents such as sugar and artifical sweeteners to a beverage powder, as well as flavor, color and an edible acid. Because of its greater affinity for water and, therefore, its preferential acquisition thereof, the water-soluble gum inhibits the acquisition of water by the water-swellable gum and, consequently, controls the degree of swelling of the water-soluble gum. In general, the more water-soluble gum that is present, the less will be the degree of swelling of the water-swellable gum.

In a preferred embodiment of the present invention, the water-swellable and water-soluble gums are both obtained from Irish Moss. The water-soluble gum, for example, can be a sodium carrageenate and the water-swellable gum a potassium calcium carrageenate. Carrageenans are generally described as extracts of Irish Moss, which term designates dried and leached plants of the two red algae, *Chrondus crispus* and *Gigartina mamillosa*. A carrageenan is also sometimes defined as an extract of the species *Chrondus crispus* only, the source of which is found in dark purple, branching, cartilaginous seaweed present on the coasts of northern Europe and North America. We prefer, however, to employ the term carrageenans as embracing both species of algae or seaweed, since it is the solubility of carrageenans in water that is determinative of their use in the beverage compositions of the present invention. Using Irish Moss as the basic gum, both water-soluble gums, such as that available under the trademark Viscarin, and water-swellable gums, such as that available under the trademark Gelcarin, can be obtained.

Gums other than carregeenans may be utilized in the beverage powder according to the present invention. Thus, the beverage mix may contain propylene glycol alginate, gum tragacanth, high viscosity sodium carboxymethyl cellulose, and guar gum, either alone or in combination, as the water-soluble gum. Other water-swellable gums that can be employed are gelatin, agar, calcium alginate, locust bean gum and furcellaran. The present invention is not to be limited to carrageenans or the above gums, it being understood that other water-soluble and water-swellable gums may be substituted with equally good results.

Any of the commonly available sugars or sugar equivalents may be employed in preparing the beverage composition as the sweetening agent. For example, sucrose and dextrose are the sugars most conveniently employed for this purpose, but, exemplarily, invert sugar, fructose, mannitol, sorbitol, saccharine and cyclamates may also be used.

Edible acids and their salts, such as citric, tartaric, adipic and fumaric acids and alkali metal salts thereof including sodium citrate, sodium tartrate, and the like, and mixtures may be employed in the beverage powder at levels which will provide the desired tartness in the reconstituted beverage.

Fruit flavors used may be any of those which are commercially available, preferably a citrus oil, e.g., orange oil, grapefruit oil, lemon oil and the like. A particularly preferred citrus oil is that which is sold encapsulated in a sugar, such as sucrose, dextrose or the like. Such encapsulated citrus oils are customarily available as amorphous, water-dispersible mixtures having been prepared from a stabilized citrus oil which, generally in the form of microscopic globules, has been emulsified in the presence of a suitable emulsifier with a sugar, e.g. corn syrup solids, or a colloid, e.g. gelatin, gum acacia, etc., and a polyol, e.g., glycerol. Particles of the amorphous mixtures are advantageously coated with suitable anticaking materials, e.g., tricalcium phosphate.

When a substantially dry beverage powder is prepared, aldehydes and esters may be included when used with matrices or carriers upon or within which for example, the acetaldehyde and ethyl butyrate are fixed or incorporated. It appears that retention of the aldehydes and esters is improved by the presence of the gums, it having particularly been noted that acetaldehyde is retained in solution more effectively when gums are present.

The beverage composition also desirably contains a clouding or opacifying agent. That which has been found most effective utilizes a plastic fat, by which term is intended to describe a product which is a mixture of fats and which is semi-solid at room temperature, e.g., 60–70° F. The opacifying agent advantageously is that described in U.S. Patent No. 3,023,106, issued Feb. 27, 1962 in the name of James L. Common.

Certain vitamins are also optional ingredients of the beverage powder, and these include vitamins A, $B_1$ and C. Quite surprisingly, it has been found that vitamin $B_1$ in addition to affording nutritional value to the beverage composition, appears to enhance its flavor and also acts in a manner, as yet undetermined, whereby the flavor and aroma of other flavor enhancers such as aldehydes and esters, especially acetaldehyde and ethyl butyrate, are improved and retained. Vitamins A and $B_1$ are generally employed in the form of their acid salts while vitamin C is utilized as free acid.

With respect to the quantities of ingredients to be used in the beverage powder of the present invention and the beverage formed therefrom, any amount may be used which provides levels sufficient to permit the stated functions to be accomplished. Thus, the water-soluble gum must be utilized in an amount sufficient to increase the viscosity of the subsequently formed beverage and the water-swellable gum in an amount sufficient to provide discrete bodies thereof for dispersion in the viscous medium. The greater the degree of pulpiness required in the finished beverage, the more water-swellable gum will be required.

It will thus be seen that the precise quantities of gums used will depend to an extent on the fruit juice that is being imitated by the present beverage and powder. Among such juices are citrus juices, such as orange, grapefruit, lemon, lime and tangerine juice, as well as non-citrus juices, such as mango, papaya, grape and pineapple juice. As will be apparent, an imitation papaya juice will require a greater percentage of swollen gum bodies than an imitation grape juice. Accordingly, more water-swellable gums will be required in the former as well as more water-soluble gums. In general, the amount of water-soluble gums will vary from about 0.4 to 3.6% and the water-swellable gums from about 0.1 to 1.5% of the beverage powder, although these ranges are only preferred. More water-soluble gum will usually be present, the ratio of soluble to swellable gums being about 2:1 to 4:1. The percent gum in the beverage, itself, will be limited only to an amount at which the beverage does not become tacky and offensive. The sweetening agent and other ingredients will be present in quantities at which they provide an imitation beverage suited to consumer tastes.

The present invention will be better understood by reference to the following example of a specific embodiment of a beverage powder according to our invention.

Example

| Ingredient: | Percentage |
| --- | --- |
| Sugar | 83.8 |
| Citric acid | 5.6 |
| Plastic fat encapsulated in gum arabic | 5.0 |
| Orange flavor | 1.8 |
| Viscarin (sodium carrageenate) | 1.0 |
| Gelcarin (potassium calcium carrageenate) | .3 |
| Trisodium citrate | .6 |
| Tricalcium phosphate | .6 |
| Vitamin C | .6 |
| Acetaldehyde in carrier | .5 |
| Ethyl butyrate in carrier | .1 |
| Color and other vitamins | .1 |

The beverage powder illustrated by the above example is dissolved in water by adding 128 grams of the mix to one quart of cold tap water and stirring until it has dissolved. The drink produced will be quite similar to fresh orange juice in flavor and texture, although no orange product has been used except the orange oil in the flavor. In particular, the beverage produced has a mouth feel reminiscent of fresh juice.

When referring to a beverage powder in the title and specification herein, it will be recognized that by "powder" is meant a subdivided solid material that has so little moisture that it is fluent and can readily be spooned from a jar or other container. No specific particle size is to be implied other than that it be such that the material is fluent and will dissolve to a large extent in water within a reasonable period of time.

While the present invention has been generally described in the foregoing specification and with particular reference to a specific embodiment of a beverage powder, it will be apparent that certain modifications and alterations in the described product will be obvious to those skilled in this art without departing from the scope of the invention. All such obvious modifications and alterations are deemed to be included within our invention, which is to be limited only by the purview of the following, appended claims.

What is claimed is:

1. A fruit flavored beverage composition in the form of a powder adapted to be mixed with an aqueous medium at a temperature of about 32° to 70° F., comprising a gum soluble in water at said temperature and a gum swellable in water at said temperature, said water-soluble gum because of its greater affinity for water, controlling the acquisition of water by said water-swellable gum and the degree of swelling thereof, said water-soluble and water-swellable gums together constituting an amount of said aqueous medium sufficient to increase its viscosity and disperse discrete swollen bodies of said water-swellable gum therein to give the medium a texture resembling that of fresh juice, the water-soluble and water-swellable gums together constituting an amount of said aqueous medium insufficient to increase its viscosity to a tacky texture; said composition also containing a fruit flavor.

2. A beverage composition as claimed in claim 1, in which said water-soluble and water-swellable gums are both obtained from Irish Moss.

3. A beverage composition as claimed in claim 2, in which said water-soluble gum is a sodium carrageenate and said water-swellable gum is a potassium calcium carrageenate.

4. A fruit flavored beverage composition in the form of a powder adapted to be mixed with an aqueous medium at a temperature of about 32° to 70° F. comprising a gum soluble in water at said temperature and a gum swellable in water at said temperature, said water-soluble gum because of its greater affinity for water, controlling the acquisition of water by said water-swellable gum and the degree of swelling thereof, said water-soluble gum being about .4 to 3.6 percent and said water-swellable gum being about .1 to 1.5 percent by weight of said composition, said gums together constituting an amount of said aqueous medium sufficient to increase its viscosity and disperse discrete swollen bodies of said water-swellable gum therein to give the medium a texture resembling that of fresh juice; said composition also containing a fruit flavor.

5. A beverage composition as claimed in claim 4, in said water-soluble gum is about .5 to 1.0 percent and said water-swellable gum is about .3 to .7 percent by weight of said composition.

6. A fruit flavored beverage composition in the form of a powder adapted to be mixed with an aqueous medium at a temperature of about 32° to 70° F., comprising a gum soluble in water at said temperature and a gum swellable in water at said temperature, said water-soluble gum being present in an amount greater than said water-swellable gum and because of its greater affinity for water controlling the acquisition of water by said water-swellable gum and the degree of swelling thereof, said water-soluble and water-swellable gums together constituting an amount of said aqueous medium sufficient to increase its viscosity and disperse discrete swollen bodies of said water-swellable gum therein to give the medium a texture resembling that of fresh juice, the water-soluble and water-swellable gums together constituting an amount of said aqueous medium insufficient to increase its viscosity to a tacky texture; said composition also containing a fruit flavor.

7. A beverage composition as claimed in claim 6, in which the ratio of water-soluble gum to water-swellable gum varies from about 4:1 to 2:1.

8. An orange flavored beverage composition in the form of a powder adapted to be mixed with an aqueous medium at a temperature of about 32° to 70° F., comprising a sodium carrageenate soluble in water at said temperature and a potassium calcium carrageenate swellable in water at said temperature, said water-soluble gum being present in a ratio of about 4:1 to 2:1 based on said water-swellable gum and because of its greater affinity for water controlling the acquisition of water by said water-swellable gum and the degree of swelling thereof, said water-soluble and water-swellable gums together constituting about .5 to 5.1 percent of said composition and being present in said aqueous medium in an amount sufficient to increase its viscosity and disperse discrete swollen bodies of said water-swellable gum therein to give the medium a texture resembling that of fresh juice, said water-soluble gum being about .4 to 3.6 percent and said water-swellable gum being about 1. to 1.5 percent of said composition; said composition also containing a fruit flavor.

9. A fruit flavored beverage composition in the form of a powder adapted to be mixed with an aqueous medium at a temperature of about 32° to 70° F., comprising a gum soluble in water at said temperature and a gum swellable in water at said temperature, said water-soluble gum because of its greater affinity for water, controlling the acquisition of water by said water-swellable gum and the degree of swelling thereof, said water-soluble and water-swellable gums together constituting an amount of said aqueous medium sufficient to increase its viscosity and disperse discrete swollen bodies of said water-swellable gum therein to give the medium a texture resembling that of fresh juice, the water-soluble and water-swellable gums together constituting an amount of said aqueous medium insufficient to increase its viscosity to a tacky texture; said composition also containing a sweetening agent, fruit flavor, and edible acid.

10. An orange flavored beverage composition in the form of a powder adapted to be mixed with an aqueous medium at a temperature of about 32° to 70° F. comprising a gum soluble in water at said temperature and a gum swellable in water at said temperature, said water-soluble gum being present in an amount greater than said water-swellable gum and because of its greater affinity for water controlling the acquisition of water by said water-swellable gum and the degree of swelling thereof, said water-soluble and water-swellable gums together constituting an amount of said aqueous medium sufficient to increase its viscosity and disperse discrete swollen bodies of said water-swellable gum therein to give the medium a texture resembling that of fresh juice, the water-soluble and water-swellable gums together constiuting an amount of said aqueous medium insufficient to increase its viscosity to a tacky texture; said composition also containing a sweetening agent, orange flavor, edible acid, and a dried emulsion of a homogenized plastic fat coated with a water-soluble gum, the fat being present in a minor proportion and the gum in a major proportion, said dried emulsion having a particle size distribution whereat with 10 percent tricalcium phosphate added 100 percent passes a #20 U.S.S. Screen and no more than 25 percent of said dried emulsion alone passes a #100 U.S.S. Screen.

11. A fruit flavored beverage, comprising a gum soluble in water at a temperature of about 32° to 70° F. and a gum swellable in water at said temperature, said water-soluble gum because of its greater affinity for water controlling the acquisition of water by said water-swellable gum and the degree of swelling thereof, said water-soluble and water-swellable gums together constituting an amount of said beverage sufficient to increase its viscosity and disperse discrete swollen bodies of said water-swellable gum therein to give said beverage a texture resembling that of fresh juice, the water-soluble and water-swellable gums together constituting an amount of said beverage insufficient to increase its viscosity to a tacky texture; said beverage also containing a fruit flavor.

12. A beverage as claimed in claim 11, in which said water-soluble gum is present in an amount greater than said water-swellable gum.

13. A beverage as claimed in claim 11, in which said water-soluble gum and water-swellable gum are both obtained from Irish Moss.

14. A beverage as claimed in claim 11, in which said water-soluble gum is present in an amount of from twice to four times said water-swellable gum.

References Cited

UNITED STATES PATENTS

| 2,021,027 | 11/1935 | Snell et al. | 99—140 X |
| 2,420,308 | 5/1947 | Gates | 99—131 X |
| 1,500,670 | 7/1924 | De Groote | 99—140 |
| 3,023,106 | 2/1962 | Common | 99—78 |

OTHER REFERENCES

Alexander J.: "Colloid Chemistry," vol. 6, 1946, Reinhold Publ. Corp., N.Y., pp. 655–656.

MAURICE W. GREENSTEIN, *Primary Examiner.*